Sept. 1, 1964 C. E. KEESLING 3,146,810
RECIPROCATING SAW WITH IMPROVED LUBRICATION
Filed April 4, 1962 2 Sheets-Sheet 1
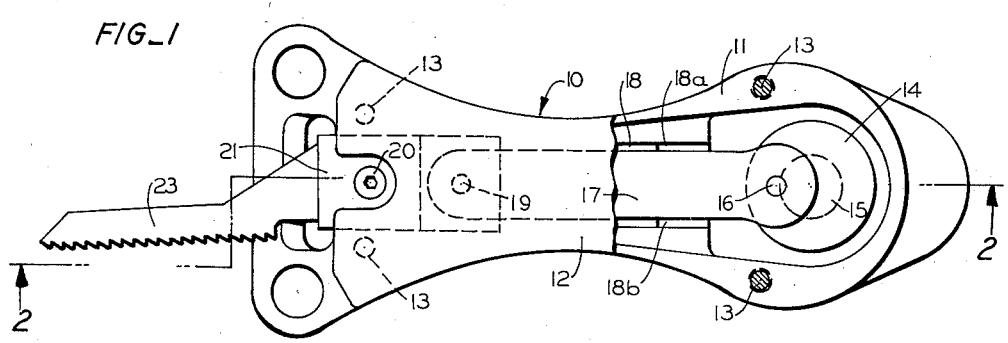
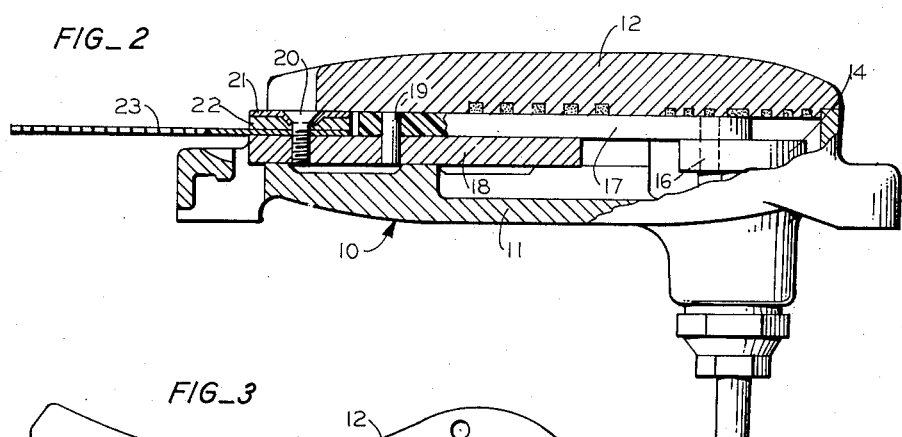
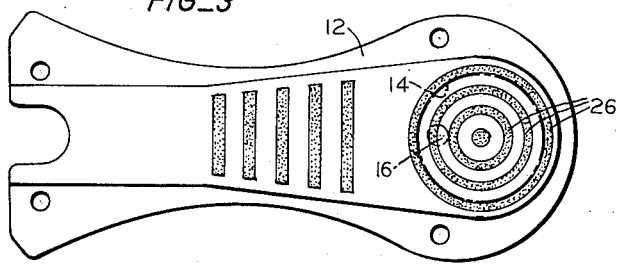
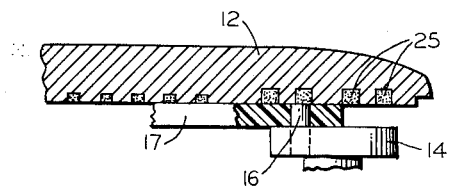
INVENTOR.
CLIFFORD E. KEESLING
BY
*Allen and Cherry*
ATTORNEYS Sept. 1, 1964   C. E. KEESLING   3,146,810
RECIPROCATING SAW WITH IMPROVED LUBRICATION
Filed April 4, 1962   2 Sheets-Sheet 2
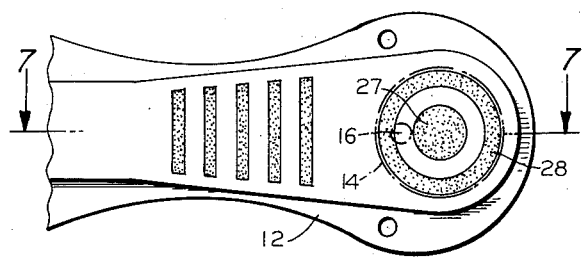
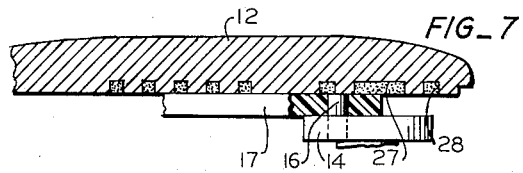
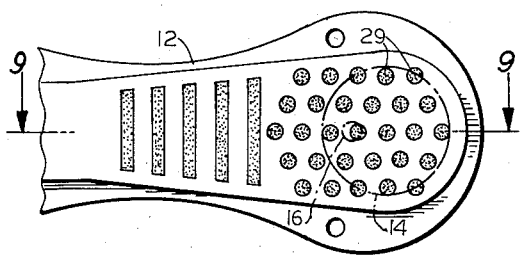
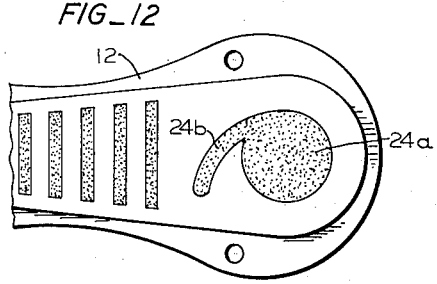
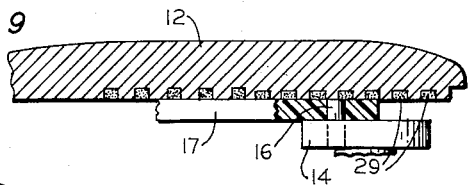
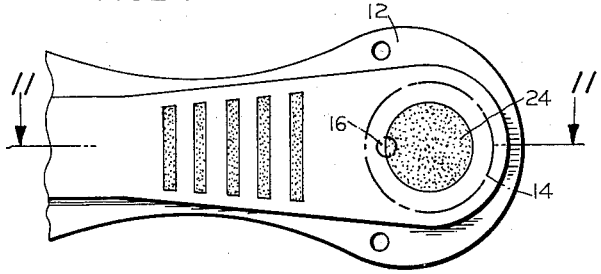
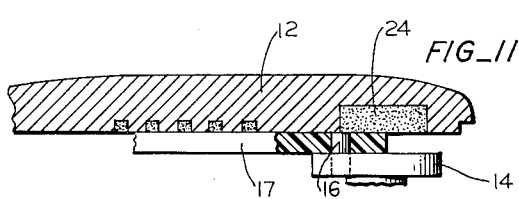
INVENTOR.
CLIFFORD E. KEESLING
BY
ATTORNEYS

United States Patent Office 3,146,810
Patented Sept. 1, 1964

3,146,810
RECIPROCATING SAW WITH IMPROVED
LUBRICATION
Clifford E. Keesling, San Jose, Calif., assignor to Machine Design Corp., Los Gatos, Calif., a corporation of Nevada
Filed Apr. 4, 1962, Ser. No. 184,998
3 Claims. (Cl. 143—68)

This invention relates to reciprocating saws in general. More particularly, this invention relates to improved lubricant-supplying arrangements provided in the housing of a reciprocating saw.

An object of this invention is to provide an improved reciprocating saw.

Another object of this invention is to provide an improved reciprocating saw with means for supplying lubricant to certain moving parts of the saw operating mechanism.

Still another object of this invention is to provide an improved reciprocating saw with lubricant-supplying means built into the saw for greatly increasing the life of the saw.

Still another object of this invention is to provide an improved reciprocating saw in which the pivot pin of the eccentric, which is provided for driving the saw blade, is arranged to be in wiping contact with a lubricant-dispensing cavity or cavities built into the housing of the saw.

Other and further objects of this invention will be apparent to those skilled in the art to which it relates from the following specification, claims and drawing.

In accordance with this invention, there is provided an improved reciprocating saw which was constructed so as to greatly improve and extend the operating life thereof. For this purpose, certain surfaces in the housing of the saw which face the rotatable driving member of the saw are provided with a lubricant-receiving cavity or cavities which may have various configurations such that the lips thereof are wiped by the pivot pin of the driving member during the rotation thereof so that lubricant is gradually dispensed from these cavities to the pivot pin as this pin is moved through its orbit. Thus, during the use of the saw, the lubricant has a tendency to move out of the lubricant-holding cavities toward the lip portions thereof and, as it does so, it is picked up by the rotating pivot pin. Lubricants having a tacky consistency may be employed so that they will not ooze out of the lubricant cavities too rapidly, but will be supplied to the moving parts gradually as needed. Furthermore, the lubricant-receiving cavities may be shaped so as to hold the lubricant more efficiently, and also so as to collect any excess lubricant fed to the driving mechanism.

Other features and details of this invention will be set forth in these specification, claims and drawing in which, briefly:

FIG. 1 is a view of this reciprocating saw with the cover portion opposite the rotatable driving member broken away;

FIG. 2 is a sectional view taken along the line 2—2 of FIG. 1;

FIG. 3 is a plan view of the cover of the saw housing showing the lubricant-receiving grooves formed therein;

FIG. 4 is a fragmentary view of another cover showing a groove of spiral configuration for receiving the lubricant;

FIG. 5 is a sectional view taken along the line 5—5 of FIG. 4;

FIG. 6 is a fragmentary view of another cover with still different configurations of lubricant-receiving grooves;

FIG. 7 is a sectional view taken along the line of 7—7 of FIG. 6;

FIG. 8 is a view of part of still another cover in which a plurality of small lubricant-receiving holes is provided;

FIG. 9 is a sectional view taken along the line 9—9 of FIG. 8;

FIG. 10 is a view of part of still another cover in which a single lubricant-receiving cavity having a diameter such that it extends partially over the orbit of the driving pivot connection is provided;

FIG. 11 is a sectional view taken along the line 11—11 of FIG. 10; and

FIG. 12 is a view of part of a cover similar to that shown in FIG. 10 in which a lubricant-collecting groove is provided to the lubricant-receiving cavity.

Referring to the drawing in detail, there is shown a reciprocating saw 10 that is provided with a housing 11 having a cover 12 that is held thereon by a plurality of machine screws 13. The housing 11 is provided with a cavity therein in which the reciprocating mechanism of the saw is positioned. This mechanism includes a rotatable disk-shaped member 14 that is provided with a pin 16 which extends from a face thereof and which is fixedly attached to this member displaced from the center thereof. The member 14 is driven by a shaft 15 which is provided with suitable bearings and which extends outward from the housing a short distance so that it may be gripped by the chuck of an electric drill or the chuck of a flexible shaft or cable drive. The exterior of the housing 11 and cover 12 is shaped to fit conveniently in the hand of the operator so that it may be firmly gripped during its use.

The pin 16 is displaced off center on the rotatable member 14 so as to provide an eccentric drive for the driving link 17 which is provided with a hole at the driven end thereof for receiving the pin 16. This link 17 is made of plastic material such as nylon or the like, and the hole receiving the pin 16 is made slightly larger than the pin so as to provide a loose fit initially, when this apparatus is assembled. A tighter fit develops between these parts during use of the device and this results from heat developed in the driven end of the link 17. This link is connected by means of the pin 19 to the slide 18 to which the pin 19 is fixedly attached. A closer fit is provided between the pin 19 and the hole formed in the member 17 receiving this pin. Suitable recesses 18a and 18b are provided in the housing 11, and the slide 18 is slidably positioned in these recesses.

The forward end of the slide 18 is provided with a threaded hole for receiving the machine screw 20 which is adapted to attach the U-shaped head member 21 to the forward end of the slide. The saw blade 23 is positioned between the filler member 22 and the slide 18, and it is clamped to this slide by the head 21 and machine screw 20 so as to be fixedly held on the slide during the reciprocation thereof by means of the eccentric drive.

The portion of the cover 12 that faces the pin 16 and the rotatable driving member 14 is provided with one or more lubricant-receiving cavities. One such cavity 24 of circular configuration is shown in FIGS. 10 and 11. A cavity 25 of spiral configuration is shown in FIG. 4, and a plurality of concentric ring shaped cavities 26 is shown in FIG. 3. On the other hand, a ring-shaped groove 28 surrounding a smaller central cavity 27 may be provided to the cover as shown in FIGS. 6 and 7. In FIGS. 8 and 9 there is shown an embodiment in which a plurality of relatively small holes 29 are provided in spaced relation in place of the other grease or lubricant-receiving cavities. In these illustrations the pin 16 and rotatable member 14 are shown in broken outline to show the orbit of this pin in relation to the lubricant containing cavities.

The diameter of the lubricant-receiving cavity 24 shown in FIGS. 10 and 11 is such that this cavity extends about half-way across the pin 16. Thus, as this pin is rotated by the rotatable member 14 the outer face of the pin wipes the edge of the cavity 24 and the lubricant creeping out of this cavity to the edge thereof is fed to the outer end of this pin. This lubricant is wiped across this pin during the aforesaid rotation, and lubricant is thus supplied to the bearing surfaces of this pin. In the form of the invention shown in FIG. 12, the cavity 24a, which is substantially the same as the diameter of the cavity 24, shown in FIGS. 10 and 11, is provided with a groove 24b which collects the lubricant from the outer surface of the drive link 17 and guides this lubricant toward the main cavity 24a. A similar arrangement is provided in FIG. 4 where the spiral groove 25 extends somewhat beyond the orbit of the pin 16 so that the outer parts of this groove function to collect lubricant from the outer surface of the link 17 and guide this lubricant inward in the spiral so that the lubricant is available to be dispensed to the pin 16.

While I have shown a preferred embodiment of the invention, it will be understood that the invention is capable of variation and modification from the form shown so that its scope should be limited only by the scope of the claims appended hereto.

What I claim is:

1. In a reciprocating saw, the combination of a housing having an elongated chamber therein open to the outside at one end thereof, said housing having a detachable cover, a slide positioned in said elongated chamber, a rotatable member positioned in said chamber, means including a pivot for connecting said slide to said rotatable member for reciprocating said slide in said elongated chamber, a saw blade, means for attaching said saw blade to one end portion of said slide, wall structure in said cover opposite said rotatable member, said wall structure having a substantially flat surface facing the outer surface of said slide, said substantially flat surface being interrupted by lubricant receiving pocket means disposed so that the outer end of said pivot wipes an edge of said pocket means continuously during its rotation and lubricant is dispensed to said pivot from said pocket means substantially continuously during the rotation of said pivot.

2. In a reciprocating saw, the combination of a housing having an elongated chamber therein open to the outside at one end thereof, said housing having a detachable cover, a slide positioned in said elongated chamber, a rotatable member positioned in said chamber, means including a pivot for connecting said slide to said rotatable member for reciprocating said slide in said elongated chamber, a saw blade, means for attaching said saw blade to one end portion of said slide, wall structure in said cover opposite said rotatable member, said wall structure having a substantially flat surface facing the outer surface of said slide, said substantially flat surface being interrupted by a plurality of small pockets for receiving lubricant, said pockets being disposed so that the outer end of said pivot wipes edges of at least two of said small pockets simultaneously and lubricant is dispensed to said pivot from said pockets substantially continuously during the rotation of said pivot.

3. In a reciprocating saw, the combination of a housing having an elongated chamber therein open to the outside at one end thereof, said housing having a detachable cover, a slide positioned in said elongated chamber, a rotatable member positioned in said chamber, means including a pivot for connecting said slide to said rotatable member for reciprocating said slide in said elongated chamber, a saw blade, means for attaching said saw blade to one end portion of said slide, wall structure in said cover opposite said rotatable member having narrow elongated pocket means for receiving lubricant, said pocket means being shaped so that the outer end of said pivot continuously wipes an edge thereof during rotation and lubricant is dispensed to said pivot from said pocket means substantially continuously during the rotation of said pivot.

References Cited in the file of this patent

UNITED STATES PATENTS

| | | |
|---|---|---|
| 2,149,983 | Smith | Mar. 7, 1939 |
| 2,187,626 | Merriman | Jan. 16, 1940 |
| 2,783,790 | Keesling | Mar. 5, 1957 |
| 2,932,205 | Keesling | Apr. 12, 1960 |